United States Patent [19]

Kaner et al.

[11] Patent Number: 5,110,768
[45] Date of Patent: May 5, 1992

[54] RAPID SOLID-STATE SYNTHESIS OF REFRACTORY MATERIALS

[76] Inventors: Richard B. Kaner, 1806 Benedict Canyon Dr., Beverly Hills, Calif. 90210; Philippe R. Bonneau, 10941 Strathmore Dr., #47, Los Angeles, Calif. 90024; Edward G. Gillan, 11565 Ohio Ave., #3, Los Angeles, Calif. 90025; John B. Wiley, 21260 E. Washington St., Walnut, Calif. 91789; Robert F. Jarvis, Jr., 6200 Edinger Ave., #622, Los Angeles, Calif. 92647; Rande Treece, 11811 Venice Blvd., #228, Los Angeles, Calif. 90025

[21] Appl. No.: 647,380

[22] Filed: Jan. 28, 1991

[51] Int. Cl.$^5$ .................. C04B 35/52; C04B 35/58
[52] U.S. Cl. ................................ 501/1; 501/87; 501/88; 501/96; 501/97; 423/409; 423/411; 423/344; 423/439; 423/440
[58] Field of Search ............... 501/87, 88, 96, 97, 501/1; 423/409, 411, 344, 439, 440

[56] References Cited

U.S. PATENT DOCUMENTS

| | | | |
|---|---|---|---|
| 2,886,454 | 5/1959 | Todd | 501/87 |
| 4,279,737 | 7/1981 | Chiamelli et al. | 423/509 X |
| 4,288,422 | 9/1981 | Chiamelli et al. | 423/509 |
| 4,308,171 | 12/1981 | Dines et al. | 423/509 X |
| 4,323,480 | 4/1982 | Dines et al. | 423/509 X |
| 4,368,115 | 1/1983 | Chianelli et al. | 208/215 |
| 4,416,863 | 11/1983 | Sato et al. | 423/344 |
| 4,446,242 | 5/1984 | Holt | 501/96 |
| 4,605,633 | 8/1986 | DeAngolis | 501/96 X |
| 4,731,235 | 3/1988 | Schrader, Jr. et al. | 501/97 X |
| 4,812,301 | 3/1989 | Davidson et al. | 423/411 X |
| 4,859,443 | 8/1989 | Marosi | 423/413 X |
| 4,859,639 | 8/1989 | Sterzel | 501/97 |
| 4,891,341 | 1/1990 | Cutler et al. | 501/96 X |
| 4,929,432 | 5/1990 | Shen | 423/344 |
| 4,944,930 | 7/1990 | Holt et al. | 423/344 |
| 4,946,630 | 8/1990 | Ezis | 423/344 X |

*Primary Examiner*—Karl Group
*Attorney, Agent, or Firm*—Poms, Smith, Lande & Rose

[57] ABSTRACT

A process for producing a refractory material having the form $TB_o$, e.g. zirconium nitride (ZrN), includes a first step of mixing a first salt having the form $TX_n$, e.g. zirconium tetrachloride ($ZrCl_4$) and a second salt having the form $A_mB$, e.g. lithium nitride ($Li_3N$) in a ratio of n/m in a container. The process also includes a second step of igniting the mixture of the first and second salts, e.g. $ZrCl_4$ and $Li_3N$, whereby the refractory material, e.g. ZrN, is produced along with byproducts having forms nAX and (n/m-o)B, e.g. 4LiCl and $(1/6)N_2$, respectively. The process further includes a third step of separating the refractory material from the byproducts by solvent extraction. The stoichiometric ratio of the second salt to the first salt is n/m, e.g. 4/3. T is selected from the group consisting of transition metals, e.g. zirconium, and tetrelides, i.e. carbon, silicon, germanium, tin and lead. X is selected from the halide group consisting of fluorine, chlorine, bromine and iodine. A is selected from the group consisting of alkali metals, i.e. lithium, sodium, potassium, rubidium and cesium, and alkaline earth metals, i.e. beryllium, magnesium, calcium, strontium and barium. B is a base selected from the group consisting of pnictides, i.e. nitrogen, hosphorus, arsenic, antimony and bismuth, and tetrelides, i.e. carbon, silicon, germanium, tin and lead, m and n are integers and o is a fraction, e.g. 3/3=1.

1 Claim, No Drawings

RAPID SOLID-STATE SYNTHESIS OF REFRACTORY MATERIALS

BACKGROUND OF THE INVENTION

1. Field of the Invention

The present invention relates to metathesis reactions between two or more solid compounds and more particularly to metathesis reactions between two salt compounds for synthesizing refractory materials within seconds.

2. Description of the Prior Art

There has been a great need to find new methods of synthesizing refractory materials. Especially important are methods which enable refractory material to be synthesized more easily than by use of traditional high temperature reactions between elements. Since solid-solid diffusion between elements is slow, traditional syntheses generally require temperature of from 500° C. to greater than 3000° C. and time periods of from days to many weeks in order to produce desired refractory materials. Even after extensive heating for long periods of time these refractory materials may still contain unreacted starting materials, unwanted phases and/or poor stoichiometry.

U.S. Pat. No. 4,279,737, entitled Hydro-Desulfurization Over Catalysts Comprising Chalcogenides of Group VIII Prepared by Low Temperature Precipitation from Nonaqueous Solution, issued to Russell R. Chianelli and Theresa Pecoraro on Jul. 21, 1981, teaches a method which is described for the preparation of chalcogenides of ruthenium, rhodium, osmium and iridium transition metals of the Periodic Table of the Elements which includes mixing in the absence of an aqueous solvent a Group VIII transition metal salt with a source of chalcogenide. The chalcogenide is selected from the group consisting of sulfur, selenium, tellurium and mixtures thereof, yielding a precipitate of the formula $MX_y$ wherein M is selected from the group consisting of ruthenium, rhodium, osmium and iridium, X is sulfur, selenium, tellurium and mixtures thereof and y is a number ranging from about 0.1 to about 3, preferably 0.1 to about 2.5. By the practice of the nonaqueous synthesis technique, Group VIII chalcogenides are prepared which are finely divided, have a high surface area, small particle size and small crystallite size which are also free of excess sulfur, water and/or hydrolysis products. This technique also permits the preparation of a heretofore unobtainable composition, layered stoichiometric osmium disulfide. The precipitates which result as a consequence of the instant process may be cleansed of any anion salt coproduct by any technique common to the art, pumping under vacuum being one such technique, washing with a suitable solvent being another. Compounds of the formula $MX_y$ wherein M, X and y are as defined above, prepared by the low temperature, nonaqueous precipitation technique herein disclosed are superior sulfur-tolerant catalysts in catalytic processes, for example, hydrodesulfurization, hydrodenitrogenation, hydroconversion, hydrogenation.

U.S. Pat. No. 4,288,422, entitled Method of Preparing Chalcogenides of Group VIII by Low Temperature Precipitation from Nonaqueous Solution, the Products Produced by Said Method and Their Use as Catalysts, issued to Russell R. Chianelli and Theresa A. Pecoraro on Sep. 8, 1981, teaches a method which described for the preparation of chalcogenides of ruthenium, rhodium, osmium and iridium transition metals of the Periodic Table of the Elements which includes mixing in the absence of an aqueous solvent a Group VIII transition metal salt with a source of chalcogenide. The chalcogenide is selected from the group consisting of sulfur, selenium, tellurium and mixtures thereof, yielding a precipitate of the formula $MX_y$ wherein M is selected from the group consisting of ruthenium, rhodium, osmium and iridium, X is sulfur, selenium, tellurium and mixtures thereof and y is a number ranging from about 0.1 to about 3, preferably 0.1 to about 2.5. By the practice of the nonaqueous synthesis technique, Group VIII chalcogenides are prepared which are finely divided, have a high surface area, small particle size and small crystallite size which are also free of excess sulfur, water and/or hydrolysis products. Layered stoichiometric osmium disulfide is prepared by this technique. The precipitates may be cleansed of any anion salt coproduct by any technique common to the art. Compounds of the formula $MX_y$ thus prepared are superior sulfur-tolerant catalysts in catalytic processes, for example, hydro-desulfurization, hydrodenitrogenation, hydroconversion, hydrogenation.

U.S. Pat. No. 4,308,171, entitled Method of Preparing Di and Poly Chalcogenides of Group VIIb by Low Temperature Precipitation from Nonaqueous Solution and Small Crystallite Size Stoichiometric Layered Dichalcogenides of Rhenium and Technetium, issued Martin B. Dines, Russell R. Chianelli and Theresa A. Pecoraro on Dec. 29, 1981, teaches a method whereby finely divided, small particle (0.1 micron or less) small crystallite (about 50 Angstrom times 100 Angstrom or less) chalcogenides of manganese, rhenium and technetium are described. These compositions are prepared by mixing in the absence of an aqueous solvent, a manganese, rhenium or technetium salt with a source of chalcogenide yielding a precipitate. The manganese, rhenium or technetium salt and the source of chalcogen can be mixed either neat or in the presence of a nonaqueous aprotic solvent. The precipitate which results before removal of the anion salt is a finely divided product. In the case of rhenium dichalcogenide the product possesses a layered structure. The anion salt may be removed by any technique common to the art, pumping under vacuum being one such technique, washing with a suitable solvent being another. A method is described for the preparation of di- and poly-chalcogenides of the formula $MX_y$ wherein M is a metal selected from the group consisting of manganese, rhenium and technetium, X is a chalcogen selected from the group consisting of sulfur, selenium, tellurium and mixtures thereof, and y is a number ranging from about 1.5 to about 4, preferably about 2, comprising the low temperature, nonaqueous precipitation of said $MX_y$ compounds from mixtures of the salts of the manganese, rhenium and technetium. The precipitation occurs in the absence of aqueous solvents. The process of the instant invention permits the preparation of materials uncontaminated by water, oxygen or hydrolysis products.

U.S. Pat. No. 4,323,480, entitled Method of Preparing Di and Poly Chalcogenides of Group IVb, Vb, Molybdenum and Tungsten Transition Metals by Low Temperature Precipitation from Non-aqueous Solution and the Product Obtained by Said Method, issued to Martin B. Dines and Russell R. Chianelli on Apr. 6, 1982, teaches the finely divided, high surface area, small crystallite (0.1 micron or less) di- and poly-transition metal chalcogenides are prepared by mixing in the absence of an aqueous solvent a transition metal salt with a source of chalcogen yielding a precipitate. The salt and the chalcogen source can be mixed either neat or in the presence of a nonaqueous solvent. The precipitate which results before removal of the anion salt is a finely divided product.

U.S. Pat. No. 4,368,115, entitled Catalysts Comprising Layered Chalcogenides of Group IVb-Group VIIb Prepared by a Low Temperature Nonaqueous Precipitate Technique, issued to Russell R. Chianelli, Theresa A. Pecoraro and Martin B. Dines on Mar. 11, 1981, teaches processes for the catalytic treatment of hydrocarbon feedstreams containing organic sulfur which include contacting the feedstream with a catalyst for a time at a temperature and pressure sufficient to effect the desired catalytic change on the feedstream. The improvement includes using as the catalyst a layered composition of the formula $MX_y$ wherein M is a transition metal selected from the group consisting of Group IVb, Vb, VIb, VIIb and uranium, X is a chalcogen selected from the group consisting of sulfur, selenium, tellurium, and mixtures thereof, y is a number ranging from about 1.5 to about 3. The catalyst is prepared by reacting neat or in the presence of a nonaqueous solvent a Group IVb to VIIb or uranium metal salt, and a source of sulfide, selenide or telluride ions, and mixing the reactants at temperatures below 400° C. and at atmospheric pressures. The catalyst may be isolated by filtration and washing with excess solvent (when one is used) or by vacuum pumping any volatile coproduced anion salt. Preferably the chalcogenide is sulfur and y is about 1.5 to about 2. The catalytic processes which are benefited by the use therein of the above-described compositions are hydrodesulfurization, hydrodenitrogenation, hydroconversion and hydrogenation run in the presence of hydrogen or a hydrogen donor solvent.

U.S. Pat. No. 4,399,115, entitled Synthesis of Silicon Nitride, issued to Kimihiko Sato, Kunihiko Terase and Hitoshi Kijimuta on Aug. 16, 1983, teaches a process for synthesizing silicon nitride by reacting a silicon halide and ammonia at a high temperature, which is characterized in that at least while the reaction product is amorphous, hydrogen and chlorine are burned in the reaction zone where a halogen containing inorganic silicon compound and ammonia are reacting, and the reaction of the reactants is effected by the heat of combustion thus obtained.

U.S. Pat. No. 4,416,863, entitled Method for Synthesizing Amorphous Silicon Nitride, issued to Kimihiko Sato, Kunihiko Terase, Hitoshi Kijimuta and Yukinori Ohta on Nov. 22, 1983. teaches a method for synthesizing amorphous silicon nitride in which wherein silicon halide and ammonia are reacted in a reaction vessel at a high temperature in the absence of oxygen to synthesize powder of amorphous silicon nitride. The powder is then separated from a gas containing therein gaseous ammonia halide which has been produced simultaneously with the amorphous silicon nitride by use of a collecting means, includes directly mixing, in advance of the separation, cool gas containing therein neither oxygen nor moisture into the gas to cool down the powder and gas so that both substances may be put in the collecting means without deposition of ammonium halide to the inner wall of the reaction vessel, and other component parts.

U.S. Pat. No. 4,731,235, entitled Method of Making Silicon Nitride, issued to John L. Schrader, Jr. and Patience G. Dowd on Mar. 15, 1988, teaches the manufacture of silicon nitride powder by the vapor phase reaction of a silicon halide with ammonia at an elevated temperature in a flowing system, oxygen content of the silicon nitride is controlled by preventing entry of room air into the reaction means and by feeding wet nitrogen into the system at about the exit end of the reaction means.

U.S. Pat. No. 4,812,301, entitled Production of Titanium Nitride, Carbide, and Carbonitride Powders, issued to Charles F. Davidson, Monte B. Shirts and Donna D. Harbuck on Mar. 14, 1989, teaches a process for producing substantially oxygen-free titanium carbide, nitride or carbonitride in powder form which includes treating a gas phase reaction mixture of titanium halide, desirably $TiCl_4$, a reductant vapor, desirably sodium or magnesium, and a reactive gas capable of furnishing carbon, nitrogen or mixtures thereof at the reaction temperature, desirably nitrogen, methane or ammonia, to a temperature in the range from 500° C. to 1250° C., preferably 800° C. to 1100° C., whereby the titanium halide is substantially simultaneously reduced and carbided, nitrided or carbonitrided. The process may also be practiced using volatile metal halides of metals such as zironium, hafnium, vanadium, niobium, tantalum and silicon for forming substantially oxygen-free carbides, nitrides or carbonitrides thereof in powder form.

U.S. Pat. No. 4,859,443, entitled Preparation of Silicon Nitride Powder, issued to Laszlo Marosi on Aug. 22, 1989, teaches about a silicon nitride powder which is prepared in a gas-phase reaction by reacting silicon tetrachloride with ammonia at above 500° C. in a fluidized bed of silicon nitride particles. An amorphous silicon nitride having a BET specific surface area of greater than 50 $m^2/g$ is used at the beginning of the reaction. The resulting silicon nitride is then separated from the ammonium chloride simultaneously formed.

U.S. Pat. No. 4,859,639, entitled Process of Making Amorphous Silicon Nitride Powder, issued to Hans-Josef Sterzel on Aug. 22, 1990, teaches in amorphous silicon nitride powder, from 0.5 to 40 mol % of the silicon are replaced by one or more of the elements boron, aluminum, yttrium, lanthanum, titanium, zirconium, tungsten and molybdenum. The powder is obtained by reacting the halides of the corresponding elements, which are dissolved in an inert organic solvent in the particular ratio desired, with ammonia. The solid reaction product formed is separated off from the liquid phase and treated at from 800° C. to 1000° C. The powder is particularly suitable as a starting material for the production of sintered articles.

U.S. Pat. No. 4,929,432, entitled Process for Producing Crystalline Silicon Nitride Powder, issued to Wei-Ming Shen on May 29, 1990, teaches a process for producing crystalline silicon nitride powder by a gas phase reaction of ammonia ($NH_3$) and silane ($SiH_4$) with a molar ratio of 7:1 or above at a temperature of 900° C. or above and the heating the as-reacted amorphous powders at a temperature of 1350° C. to 1800° C. to convert the powders to a highly pure and submicron crystalline silicon nitride powder comprising at least a 90% alpha-$Si_3N_4$ phase.

U.S. Pat. No. 4,944,930, entitled Synthesis of Fine-Grained Alpha-Silicon Nitride by a Combustion Process, issued to J. Holt, Donald D. Kingman and Gregory M. Bianchini on Jul. 31, 1990, teaches a combustion synthesis process for the preparation of alpha-silicon nitride and composites thereof is disclosed. Preparation of the alpha-silicon nitride comprises the steps of dry mixing silicon powder with an alkali metal azide, such as sodium azide, cold-pressing the mixture into any desired shape, or loading the mixture into a fused, quartz crucible, loading the crucible into a combustion chamber, pressurizing the chamber with nitrogen and igniting the mixture using an igniter pellet. The method for the preparation of the composites includes dry mixing silicon powder (Si) or silicon dioxide ($SiO_2$), with a metal or metal oxide, adding a small amount of an alkali metal azide such as sodium azide, introducing the mixture into a suitable combustion chamber, pressurizing the combustion chamber with nitrogen, igniting the mixture within the combustion chamber, and isolating the alpha-silicon nitride formed as a reaction product.

SUMMARY OF INVENTION

In view of the foregoing factors and conditions which are characteristic of the prior art it is the primary object of the present invention to provide metathesis reactions between two salt compounds for synthesizing refractory materials within seconds.

It is another object of the present invention to provide metathesis reactions which can produce refractory materials very rapidly while requiring only a small amount of heat or energy to initiate them.

It is still another object of the present invention to provide metathesis reactions which can produce refractory materials very rapidly and in which the starting materials and their byproduct are chosen to be soluble in certain solvents so that they can be readily removed resulting in refractory materials of high purity.

It is yet another object of the present invention to provide metathesis reactions which can produce refractory materials of controlled particle size and crystallinity very rapidly.

It is still yet another object of the present invention to provide metathesis reactions which can produce high quality solid solution refractory materials.

In accordance with the present invention an embodiment of a process for producing a refractory material having the form $TB_o$, e.g. zirconium nitride (ZrN) is described. The process includes a first step of mixing a first salt having the form $TX_n$, e.g. zirconium tetrachloride ($ZrCl_4$) and a second salt having the form $A_mB$, e.g. lithium nitride ($Li_3N$) in a ratio of n/m in a container. The process also includes a second step of igniting the mixture of the first and second salts, e.g. $ZrCl_4$ and $Li_3N$, whereby the refractory material, e.g. ZrN, is produced along with byproducts having forms nAX and (n/m-o)B, e.g. 4LiCl and $(1/6)N_2$, respectively. The process further includes a third step of separating the refractory material from the byproducts by solvent extraction. The stoichiometric ratio of the second salt to the first salt is n/m, e.g. 4/3. T is selecting from the group consisting of transition metals, e.g. zirconium, and tetrelides, i.e. carbon, silicon, germanium, tin and lead. X is selected from the halide group consisting of fluorine, chlorine, bromine and iodine. A is selected from the group consisting of alkali metals, i.e. lithium, sodium, potassium, rubidium and cesium, and alkaline earth metals, i.e. beryllium, magnesium, calcium, strontium and barium. B is a base selected from the group consisting of pnictides, i.e. nitrogen, phosphorus, arsenic, antimony and bismuth, and tetrelides, i.e. carbon, silicon, germanium, tin and lead, m and n are integers and o is a fraction, e.g. 3/3=1.

Other claims and many of the attendant advantages will be more readily appreciated as the same becomes better understood by reference to the following detailed description.

The features of the present invention which are believed to be novel are set forth with particularity in the appended claims.

DESCRIPTION OF THE PREFERRED EMBODIMENT

In order to best understand the present invention it is necessary to refer to the following description of the preferred embodiment. A process for producing a refractory material having the form $TB_o$ includes a first step of mixing a first salt having the form $TX_n$ and a second salt having the form $A_mB$ in a container. The process also includes a second step of igniting the mixture of the first and second salts whereby the refractory material is produced along with byproducts having forms nAX and (n/m-o)B. The process further includes a third step of separating the refractory material from the byproducts by solvent extraction. The stoichiometric ratio of the second salt to the first salt is n/m. T is selected from the group consisting of transition metals, e.g. zirconium and tetrelides, i.e. carbon, silicon, germanium, tin and lead. X is from the halide group consisting of fluorine, chlorine, bromine and iodine. A is selected from the group consisting of alkali metals, i.e. lithium, sodium, potassium, rubidium and cesium, and alkaline earth metals, i.e. beryllium, magnesium, calcium, strontium and barium. B is a base selected from the group consisting of pnictides, i.e. nitrogen, phosphorus, arsenic, antimony and bismuth, and tetrelides, i.e. carbon, silicon, germanium, tin and lead, m and n are integers and o is a fraction, e.g. 3/3=1.

EXAMPLE 1

Rapid Solid-State Synthesis of Zirconium Nitride, ZrN

A mortar and pestle was used to mix 0.991 gram of zirconium tetrachloride ($ZrCl_4$) and 0.204 gram of lithium nitride ($Li_3N$) in order to form the reactant mixture with a stoichiometric ratio of $Li_3N$ to $ZrCl_4$ of 4/3. The reactant mixture was placed in a 45 milliliter stainless steel container. A screw top cap was placed on the stainless steel container. The screw top cap had two insulated leads protruding therethrough, which held a nichrome filament in the reactant mixture. An external electric charge was applied to the leads for no more than two seconds thereby igniting the reactant mixture. The resulting brown product was washed with methanol, dried and then ground with a mortar and pestle. The product was further washed with ten percent nitric acid, water and acetone on a vacuum filter. The powder was then dried on a vacuum line. The resulting product was pure ZrN with a cubic lattice spacing of 4.57 Angstroms as determined by X-ray powder diffraction. Use of the Scherrer equation gave a calculated particle size of 200-250 Angstroms. See Elements of X-ray Diffraction written by B. D. Cullity, Addison-Wesley, Reading, Mass., 1956. The product yield was fifty five percent (0.2488 gram out of 0.4475 gram theoretically possible). A pressed disc indicated metallic type conductivity. A balanced equation is as follows:

$$ZrCl_4 + 4/3\ Li_3N \rightarrow ZrN + 4LiCl + 1/6 N_2$$

EXAMPLE 2

Rapid Solid-State Synthesis of Zirconium Nitride, ZrN

A mortar and pestle was used to mix 4.434 gram of zirconium tetrachloride (ZrCl$_4$) and 0.882 gram of lithium nitride (Li$_3$N) in order to form the reactant mixture with a stoichiometric ratio of Li$_3$N to ZrCl$_4$ of 4/3. The reactant mixture was placed in a 45 milliliter stainless steel container. A screw top cap was placed on the stainless steel container. The screw top cap had two insulated leads protruding therethrough, which held a nichrome filament in the reactant mixture. An external electric charge was applied to the leads for no more than two seconds thereby igniting the reactant mixture. The resulting yellow-brown product was washed with methanol, dried and then ground with a mortar and pestle. The product was further washed with ten percent nitric acid, methanol, water and acetone on a vacuum filter. The powder was then dried on a vacuum line. The resulting light-brown product was pure ZrN with a cubic lattice spacing of 4.57 Angstroms as determined by X-ray powder diffraction. Use of the Scherrer equation gave a calculated particle size of 500-600 Angstroms. The product yield was ninety-one percent (1.822 grams out of 1.998 grams theoretically possible). A pressed disc indicated metallic type conductivity. A balanced equation is as follows:

$$ZrCl_4 + 4/3\ Li_3N \rightarrow ZrN + 4LiCl + 1/6N_2$$

EXAMPLE 3

Rapid Solid-State Synthesis of Titanium Nitride, TiN

A mortar and pestle was used to mix 0.5807 gram of titanium tetraiodide (TiI$_4$) and 0.0526 gram of lithium nitride (Li$_3$N) in order to form the reactant mixture with a stoichiometric ratio of Li$_3$N to ZrCl$_4$ of 4/3. The reactant mixture was placed in a 45 milliliter stainless steel container. A screw top cap was placed on the stainless steel container. The screw top cap had two insulated leads protruding therethrough, which held a nichrome filament in the reactant mixture. An external electric charge was applied to the leads for no more than two seconds thereby igniting the reactant mixture. The resulting black product was washed with methanol, water, and dried with acetone on a vacuum filter. The resulting product was pure TiN with a cubic lattice spacing of 4.22 Angstroms as determined by X-ray powder diffraction. Use of the Scherrer equation gave a calculated particle size of 200-250 Angstroms. A balanced equation is as follows:

$$TiI_4 + 4/3\ Li_3N \rightarrow TiN + 4LiI + 1/6N_2$$

EXAMPLE 4

Rapid Solid-State Synthesis of Hafnium Nitride, HfN

A mortar and pestle was used to mix 0.6765 gram of hafnium tetrachloride (HfCl$_4$) and 0.0980 gram of lithium nitride (Li$_3$N) in order to form the reactant mixture with a stoichiometric ratio of Li$_3$N to ZrCl$_4$ of 4/3. The reactant mixture was placed in a 45 milliliter stainless steel container. A screw top cap was placed on the stainless steel container. The screw top cap had two insulated leads protruding therethrough, which held a nichrome filament in the reactant mixture. An external electric charge was applied to the leads for no more than two seconds thereby igniting the reactant mixture. The resulting black product was washed with methanol and water and dried with acetone on a vacuum filter. The resulting product was pure HfN with a cubic lattice spacing of 4.52 Angstroms as determined by X-ray powder diffraction. Use of the Scherrer equation gave a calculated particle size of approximately 150 Angstroms. A balanced equation is as follows:

$$HfCl_4 + 4/3\ Li_3N \rightarrow HfN + 4LiCl + 1/6N_2$$

EXAMPLE 5

Rapid Solid-State Synthesis of Silicon Nitride, Si$_3$N$_4$

A mortar and pestle was used to mix 0.1984 gram of silicon tetraiodide (SiI$_4$) and 0.0340 gram of lithium nitride (Li$_3$N) in order to form the reactant mixture with a stoichiometric ratio of Li$_3$N to ZrCl$_4$ of 4/3. The reactant mixture was placed in a 45 milliliter stainless steel container. A screw top cap was placed on the stainless steel container. The screw top cap had two insulated leads protruding therethrough, which held a nichrome filament in the reactant mixture. An external electric charge was applied to the leads for no more than two seconds thereby igniting the reactant mixture. The resulting grey product was washed with methanol and water to remove lithium iodide, and dried with acetone on a vacuum filter. The resulting light-grey product was amorphous as determined by X-ray powder diffraction. No crystallinity was observed even after heating the sample to 900° C. under vacuum. A balanced equation is as follows:

$$3SiI_4 + 4Li_3N \rightarrow Si_3N_4 + 12LiI$$

EXAMPLE 6

Rapid Solid-State Synthesis of Zirconium Phosphide, ZrP

A mortar and pestle was used to mix 0.3181 gram of zirconium tetrachloride (ZrCl$_4$) and 0.1819 gram of sodium phoside (Na$_3$P) in order to form the reactant mixture with a stoichiometric ratio of Na$_3$P to ZrCl$_4$ of 4/3. The reactant mixture was placed in a 45 milliliter stainless steel container. A screw top cap was placed on the stainless steel container. The screw top cap had two insulated leads protruding therethrough, which held a nichrome filament in the reactant mixture. An external electric charge was applied to the leads for no more than two seconds thereby igniting the reactant mixture. The resulting grey-black product was washed with methanol and water on a vacuum filter. The powder was then dried on a vacuum line. The resulting product was pure ZrP with a cubic lattice spacing of 5.29 Angstroms as determined by X-ray powder diffraction. The product yield was approximately forty-five percent. A balanced equation is as follows:

$$ZrCl_4 + 4/3\ Na_3P \rightarrow ZrP + 4NaCl + 1/12P_4$$

EXAMPLE 7

Rapid Solid-State Synthesis of Molybdenum Carbide, Mo$_2$C

A mortar and pestle was used to mix 0.5145 gram of molybdenum pentachloride (MoCl$_5$) and 0.3292 gram of sodium acetylide (Na$_2$C$_2$) in order to form the reactant mixture with a stoichiometric ratio of $Na_2C_2$ to $MoCl_5$ of 5/2. The reactant mixture was placed in a 45 milliliter stainless steel container. A screw top cap was placed on the stainless steel container. The screw top cap had two insulated leads protruding therethrough, which held a nichrome filament in the reactant mixture. An external electric charge was applied to the leads for no more than two seconds thereby igniting the reactant mixture. The resulting black product was washed with methanol, water and acetone on a vacuum filter. The powder was then dried on a vacuum line. The resulting product contained $Mo_2C$ as determined by X-ray powder diffraction. The product yield was fifty percent (0.1456 gram out of 0.2938 gram theoretically possible). A balanced equation is as follows:

$$MoCl_5 + 5/2 Na_2C_2 \rightarrow 1/2 Mo_2C + 5NaCl + 9/2 C$$

EXAMPLE 8

Rapid Solid-State Synthesis of Silicon Carbide, SiC

A mortar and pestle was used to mix 0.3556 gram of carbon tetraiodide ($CI_4$) and 0.0514 gram of magnesium silicide ($Mg_2Si$) in order to form the reactant mixture with a stoichiometric ratio of $Mg_2Si$ to $CI_4$ of 1/1. The reactant mixture was placed in a 45 milliliter stainless steel container. A screw top cap was placed on the stainless steel container. The screw top cap had two insulated leads protruding therethrough, which held a nichrome filament in the reactant mixture. An external electric charge was applied to the leads for no more than two seconds thereby igniting the reactant mixture. The resulting black product was washed with methanol, water, dried and then ground with a mortar and pestle., The product was further washed with ten percent $HF/HNO_3$ (to remove Si impurities), methanol, water and acetone on a vacuum filter. The resulting product contained silicon carbide, SiC, as indicated by X-ray powder diffraction. A balanced equation is as follows:

$$Mg_2Si + CI_4 \rightarrow SiC + 2MgI_2$$

EXAMPLE 9

Rapid Solid-State Synthesis of Zirconium Disilicide, $ZrSi_2$

A mortar and pestle was used to mix 0 3551 gram of zirconium tetrachloride ($ZrCl_4$) and 0.1005 gram of magnesium silicide ($Mg_2Si$) in order to form the reactant mixture with a stoichiometric ratio of $Mg_2Si$ to $ZrCl_4$ of 1/1. The reactant mixture wa placed in a 45 milliliter stainless steel container. A screw top cap was placed on the stainless steel container. The screw top cap had two insulated leads protruding therethrough, which held a nichrome filament in the reactant mixture. An external electric charge was applied to the leads for no more than two seconds thereby igniting the reactant mixture. The resulting black product was washed with methanol, water, acetone, and air dried. The product was further washed with ten percent nitric acid (to remove trace metal impurities), water and acetone on a vacuum filter. The resulting product was single phase $ZrSi_2$ as determined by X-ray powder diffraction. A balanced equation is as follows:

$$ZrCl_4 + Mg_2Si \rightarrow 1/2 ZrSi_2 + 2MgCl_2 + 1/2 Zr$$

EXAMPLE 10

Rapid Solid-State Synthesis of Molybdenium Disilicide, $MoSi_2$

A mortar and pestle was used to mix 0.2980 gram of molybdenum pentachloride ($MoCl_5$) and 0.0987 gram of magnesium silicide ($Mg_2Si$) in order to form the reactant mixture with a stoichiometric ratio of $Mg_2Si$ to $MoCl_5$ of 5/4. The reactant mixture was placed in a 45 milliliter stainless steel container. A screw top cap was placed on the stainless steel container. The screw top cap had two insulated leads protruding therethrough, which held a nichrome filament in the reactant mixture. An external electric charge was applied to the leads for no more than two seconds thereby igniting the reactant mixture. The resulting black product was washed with methanol, water and air dried. The product was further washed with aqua regia (to remove molybdenum (Mo) metal impurities), and acetone on a vacuum filter. The resulting product was single phase $MoSi_2$ as determined by X-ray powder diffraction. A balanced equation is as follows:

$$MoCl_5 + 5/4\, Mg_2Si \rightarrow 5/8\, MoSi_2 + 5/2\, MgCl_2 + 3/8\, Mo$$

EXAMPLE 11

Rapid Solid-State Synthesis of Iron Silicide, FeSi

A mortar and pestle was used to mix 0.4481 gram of iron (III) chloride ($FeCl_3$) and 0.20254 gram of magnesium silicide ($Mg_2Si$) in order to form the reactant mixture with a stoichiometric ratio of $Mg_2Si$ to $FeCl_3$ of 3/4. The reactant mixture was placed in a 45 milliliter stainless steel container. A screw top cap was placed on the stainless steel container. The screw top cap had two insulated leads protruding therethrough, which held a nichrome filament in the reactant mixture. An external electric charge was applied to the leads for no more than two seconds thereby igniting the reactant mixture. The resulting black product was washed with methanol, water and acetone on a vacuum filter. The product was further washed with ten percent nitric acid to remove trace metal impurities. The resulting product was single phase FeSi as determined by X-ray powder diffraction. A balanced equation is as follows:

$$FeCl_3 + 3/4 Mg_2Si \rightarrow 3/4\, FeSi + 3/2\, MgCl_2 + 1/4 Fe$$

Other examples of this invention can be generated using different combinations of elements T, X, A and B. The element T is selected from the group of transition metals, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lanthanum (La), hafnium (Hf), tantalum (Ta), tungsten (W), rhenium (Re), osmium (Os), iridium (Ir), platinum (Pt), gold (Au), mercury (Hg) and tetrelides, consisting of carbon (C), silicon (Si), germanium (Ge), tin (Sn) and lead (Pb). The element X is selected from the halide group, consisting of fluorine (F), chlorine (Cl), bromine (Br) and iodine (I). The element A is selected from the group of alkali metals and alkaline earth metals, consisting of lithium (Li), sodium (Na), potassium (K), rubidium (Rb), cesium (Cs), beryllium (Be), magnesium (Mg), calcium (Ca), strontium (Sr) and barium (Ba). The element B is selected a base from the group of pnictides, consisting of nitrogen (N), phosphorus (P), arsenic (As), antimony (Sb) and bismuth (Bi), and tetrelides, consisting of carbon (C), silicon (Si), germanium (Ge), tin (Sn) and lead (Pb).

From the foregoing it can be seen that a process for producing the refractory material has been described. Accordingly it is intended that the foregoing disclosure shall be considered only as an illustration of the principle of the present invention.

What is claimed is:

1. A process for producing a refractory material having the form $TB_o$ comprising the steps of:
   a. mixing a first salt having the form $TX_n$ and a second salt having the form $A_mB$ with the stoichiometric ratio of said second salt to said first salt being n/m in a container where T is selected from the group consisting of transition metals carbon, silicon, germanium, tin and lead, X is selected from the halide group consisting of fluorine, chlorine, bromine and iodine, A is selected from the group consisting of lithium, sodium, potassium, rubidium, cesium, beryllium, magnesium, calcium, strontium and barium, B is a base selected from the group consisting of nitrogen, phosphorus, arsenic, antimony, bismuth, carbon, silicon, germanium, tin and lead, subscript m and subscript n are integers and subscript o is a fraction;
   b. igniting said mixture of said first and second salts whereby said refractory material is produced along with byproducts having forms nAX and (n/m-o)B; and
   c. separating said refractory material from said byproducts.

* * * * *

UNITED STATES PATENT AND TRADEMARK OFFICE
CERTIFICATE OF CORRECTION

PATENT NO. : 5,110,768
DATED : May 5, 1992
INVENTOR(S) : Kaner et al.

It is certified that error appears in the above-indentified patent and that said Letters Patent is hereby corrected as shown below:

In Column 1, before "BACKGROUND OF THE INVENTION" the following Government acknowledgment should be inserted:
-- This invention was made with Government support under Grant No. CHE 8657822, awarded by the National Science Foundation. The Government has certain rights in this invention. --

Signed and Sealed this

First Day of June, 1999

Attest:

Attesting Officer

Q. TODD DICKINSON

Acting Commissioner of Patents and Trademarks